(12) United States Patent
Ke et al.

(10) Patent No.: US 12,474,776 B2
(45) Date of Patent: Nov. 18, 2025

(54) HEAD-MOUNTABLE DISPLAY (HMD) VIRTUAL IMAGE DISTANCE ADJUSTMENT BASED ON EYE TIREDNESS OF HMD WEARER

(71) Applicant: Hewlett-Packard Development Company, L.P., Spring, TX (US)

(72) Inventors: Hsiang-Ta Ke, Taipei (TW); Chin Ju Chiang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/845,690

(22) PCT Filed: Mar. 11, 2022

(86) PCT No.: PCT/US2022/019915
§ 371 (c)(1),
(2) Date: Sep. 10, 2024

(87) PCT Pub. No.: WO2023/172266
PCT Pub. Date: Sep. 14, 2023

(65) Prior Publication Data
US 2025/0190051 A1    Jun. 12, 2025

(51) Int. Cl.
G06K 9/00         (2022.01)
G06F 3/01         (2006.01)
G06V 40/18        (2022.01)

(52) U.S. Cl.
CPC .............. G06F 3/013 (2013.01); G06F 3/015 (2013.01); G06V 40/18 (2022.01)

(58) Field of Classification Search
CPC ......... G06F 3/013; G06F 3/015; G06V 40/18; H04N 13/144; G02B 27/0093
See application file for complete search history.

(56) References Cited

U.S. PATENT DOCUMENTS

| | | | |
|---|---|---|---|
| 2015/0187115 A1 | 7/2015 | Macdonald et al. | |
| 2016/0363770 A1* | 12/2016 | Kim | G02B 27/0093 |
| 2017/0127055 A1* | 5/2017 | Khabiri | H04N 13/144 |
| 2019/0331922 A1 | 10/2019 | Kim et al. | |
| 2020/0174284 A1 | 6/2020 | Chan et al. | |
| 2020/0205657 A1 | 7/2020 | Li et al. | |

FOREIGN PATENT DOCUMENTS

| | | |
|---|---|---|
| CN | 113143299 A | 7/2021 |
| KR | 10-1955293 B1 | 3/2019 |

* cited by examiner

*Primary Examiner* — Abdul-Samad A Adediran
(74) *Attorney, Agent, or Firm* — Quarles & Brady LLP (57) ABSTRACT

Eye tiredness of a wearer of a head-mountable display is determined by a processor. The distance from eyes of the wearer of the head-mountable display to a virtual image displayed by the head-mountable display is adjusted by the processor based on the eye tiredness of the wearer of the head-mountable display that has been determined.

20 Claims, 7 Drawing Sheets

HEAD-MOUNTABLE DISPLAY (HMD) VIRTUAL IMAGE DISTANCE ADJUSTMENT BASED ON EYE TIREDNESS OF HMD WEARER

BACKGROUND

Extended reality (XR) technologies include virtual reality (VR), augmented reality (AR), and mixed reality (MR) technologies, and quite literally extend the reality that users experience. XR technologies may employ head-mountable displays (HMDs). An HMD is a display device that can be worn on the head. In VR technologies, the HMD wearer is immersed in an entirely virtual world, whereas in AR technologies, the HMD wearer's direct or indirect view of the physical, real-world environment is augmented. In MR, or hybrid reality, technologies, the HMD wearer experiences the merging of real and virtual worlds.

DETAILED DESCRIPTION

As noted in the background, a head-mountable display (HMD) can be employed as an extended reality (XR) technology to extend the reality experienced by the HMD's wearer. An HMD can include one or multiple small display panels in front of the wearer's eyes, as well as various sensors to detect or sense the wearer and/or the wearer's environment. Images on the display panels convincingly immerse the wearer within an XR environment, be it a virtual reality (VR), augmented reality (AR), a mixed reality (MR), or another type of XR. An HMD can also include one or multiple cameras, which are image-capturing devices that capture still or motion images.

Particularly in VR technologies, in which the wearer of an HMD is immersed in a virtual world, which may also be referred to as virtual space or a virtual environment, the HMD wearer may experience eye strain, eye fatigue, and/or blurred vision during prolonged HMD usage. Such deleterious effects can result from the HMD wearer having to maintain his or her focus on a virtual image a preset distance away from the wearer's eyes. The HMD wearer's eye muscles may have to maintain a constant tension to achieve such sustained focus, which can lead to eye tiredness that in turn causes these effects.

Techniques described herein ameliorate these issues resulting from prolonged HMD usage. In particular, when eye tiredness of an HMD wearer is detected, the techniques responsively adjust virtual image distance. Adjusting the distance from the eyes of the HMD wearer to the virtual image being viewed within the virtual environment can reduce eye strain, eye fatigue, and/or blurred vision. In response to virtual image distance adjustment, the wearer's eye muscles change in tension to maintain focus on the virtual image. Such a change in eye muscle tension is more natural than maintaining constant tension, reducing eye tiredness and thus reducing the deleterious effects that can result.

Figure 1A:
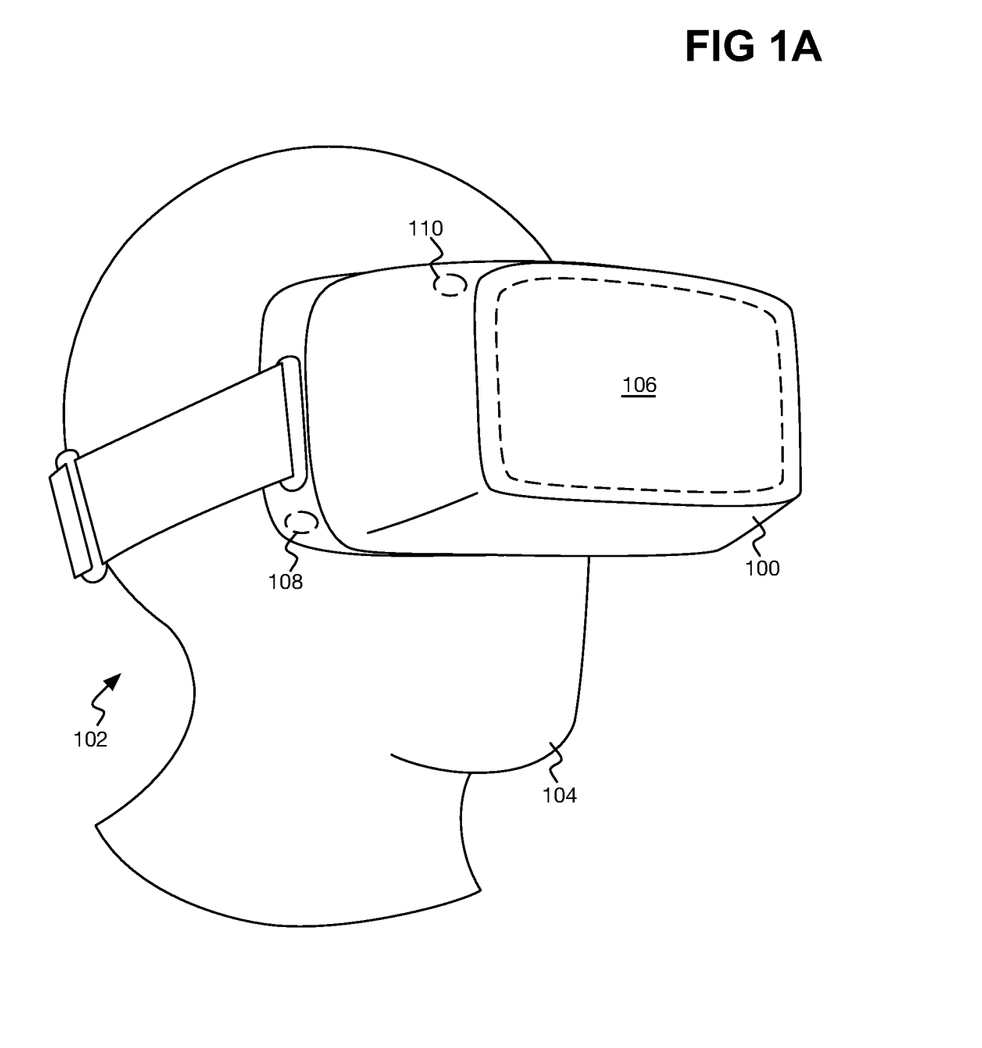
FIGS. 1A, 1B, and 1C are perspective view, block, and top view diagrams, respectively, of an example head-mountable display (HMD) that can be used in an extended reality (XR) environment.
Figure 1B:
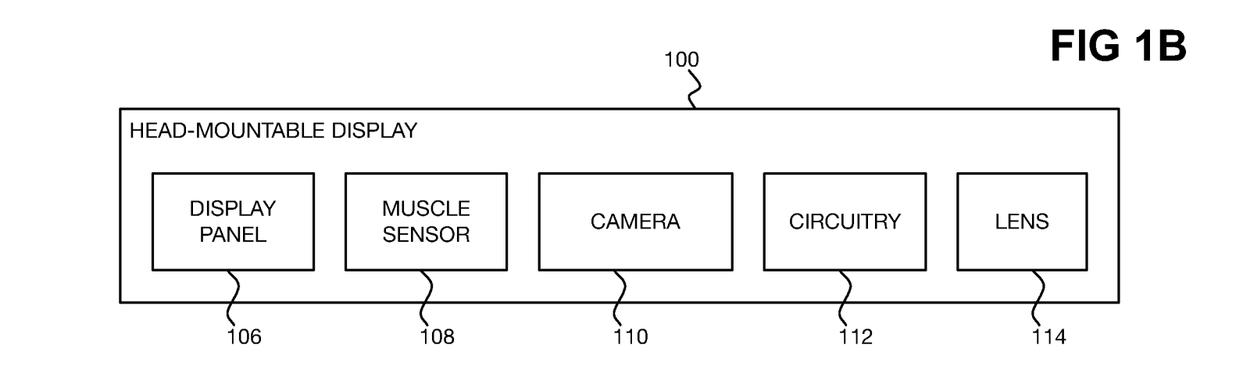
Figure 1C:
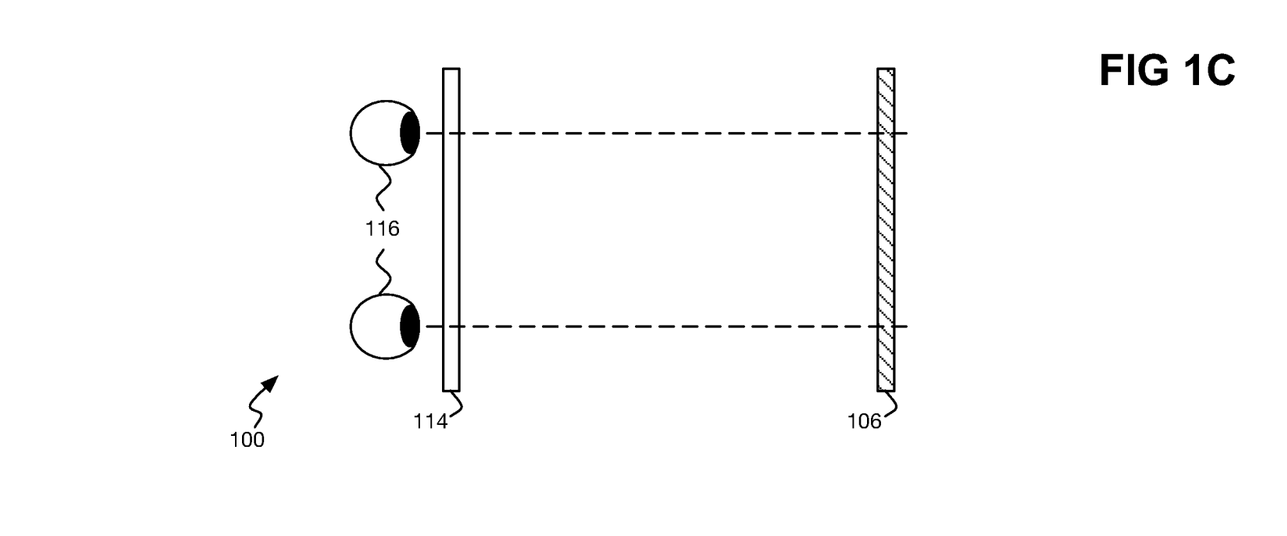

FIGS. 1A, 1B, and 1C show perspective view, block, and top view diagrams of an example HMD 100 worn by a wearer 102 and positioned against the face 104 of the wearer 102 at one end of the HMD 100. The HMD 100 can include a display panel 106 inside the other end of the HMD 100 and that is positionable incident to eyes 116 of the wearer 102 (per FIG. 1C). The display panel 106 may in actuality include a right display panel incident to and viewable by the wearer 102's right eye, and a left display panel incident to and viewable by the wearer's 102 left eye. By suitably displaying images on the display panel 106, the HMD 100 can immerse the wearer 102 within an XR.

The HMD 100 can include a muscle sensor 108 positioned adjacent to or near an eye 116 of the HMD wearer 102. There may be multiple such sensors 108 for one or both eyes 116 of the wearer 102. The muscle sensor 108 may be an electromyographic (EMG) sensor, or another type of muscle-response sensor, which outputs EMG signals that can be indicative of ciliary and extraocular eye muscle strain of the HMD wearer 102. The ciliary eye muscle is the intrinsic muscle of the eye formed as a ring of smooth muscle, and controls accommodation for viewing objects at varying distances. The extraocular eye muscles are the extrinsic muscles of the eye that control eye movement.

The HMD 100 can include an eye camera 110, such as an infrared (IR) camera, which is directed towards an eye 116 of the wearer 102 to capture eye images of this eye 116. There may be two eye cameras 110 so that there is a camera 110 to capture eye images of each of the wearer 102's eyes. The camera 110 captures eye images from which the size of the pupil of an eye 116 of the wearer 102 can be measured. The change in eye pupil size over time can be indicative of iris sphincter and dilator eye muscle strain of the HMD wearer 102. The iris sphincter muscle is the muscle of the eye that encircles the pupil of the iris, and functions to constrict the pupil. The iris dilator muscle is the muscle of the eye that runs radially in the iris, and functions to dilate the pupil.

The HMD 100 can include circuitry 112 (per FIG. 1B). The circuitry 112 may be in the form of a non-transitory computer-readable data storage medium storing program code executable by a processor. The processor and the medium may be integrated within an application-specific integrated circuit (ASIC) in the case in which the processor is a special-purpose processor. The processor may instead be a general-purpose processor, such as a central processing unit (CPU), in which case the medium may be a separate semiconductor or other type of volatile or non-volatile memory. The circuitry 112 may thus be implemented in the form of hardware (e.g., a controller) or in the form of hardware and software.

The HMD 100 can include a lens 114 (per FIGS. 1B and 1C). The lens 114 is disposed between the eyes 116 of the HMD wearer 102 and the display panel 106. As depicted, there is one lens 114 for both eyes 116, but in another implementation there may be a separate lens 114 for each eye 116. The lens 114 may be convex in relation to each eye 116. The lens 114 has an adjustable focal length.

For example, the lens 114 may be a liquid crystal lens having transparent electrodes on either side of the lens 114, such as in the form of an indium tin oxide (ITO) coating on each side of the lens 114. By adjusting the voltage applied between the electrodes, the focal length of the lens 114 is correspondingly adjusted. This is because the liquid crystals within the lens 114 respond to the electric field created via the applied voltage, rotating more outwards with increasing voltage to cause a smaller parabolic curvature of the lens 114, and thus creating a longer focal length.

Figure 2:
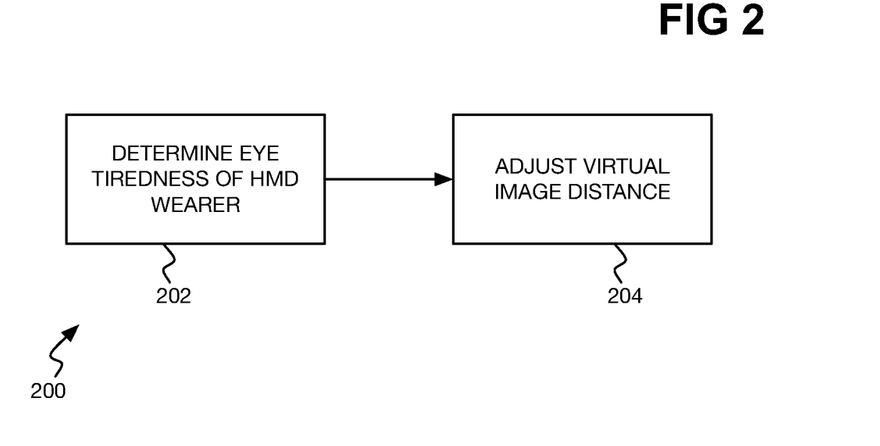
FIG. 2 is a flowchart of an example method for adjusting HMD virtual image distance based on eye tiredness of the HMD wearer.

FIG. 2 shows an example general method 200 for reducing eye tiredness of the HMD wearer 102. The method 200 can be performed by a processor, such as that of the circuitry 112, or that of a host computing device that may be communicatively connected to the HMD 100. The method 200 can be implemented as a non-transitory computer-readable data storage medium storing program code that is executable by such a processor.

The method 200 includes determining eye tiredness of the HMD wearer 102 (202). Eye tiredness may be determined based on ciliary and extraocular eye muscle strain that is itself determined based on EMG signals from the muscle sensor 108 of the HMD 100. Eye tiredness may additionally or instead be determined based on iris sphincter and dilator eye muscle strain that is itself determined based on the change in eye pupil size of the wearer 102 as determined from eye images captured by the camera 110 of the HMD 100. Particular techniques for determining eye tiredness in these ways are described in detail later in the detailed description.

The method 200 includes responsively adjusting the distance to the virtual image that the HMD wearer 102 is viewing as a result of immersion within a virtual environment via the HMD 100 (204). The virtual image distance is adjusted based on the determined eye tiredness of the HMD wearer 102, by change the focal length of the lens 114 to correspondingly change the virtual image distance with changing eye tiredness. Particular techniques for adjusting virtual image distance based on eye tiredness are described in detail later in the detailed description.

Figure 3:
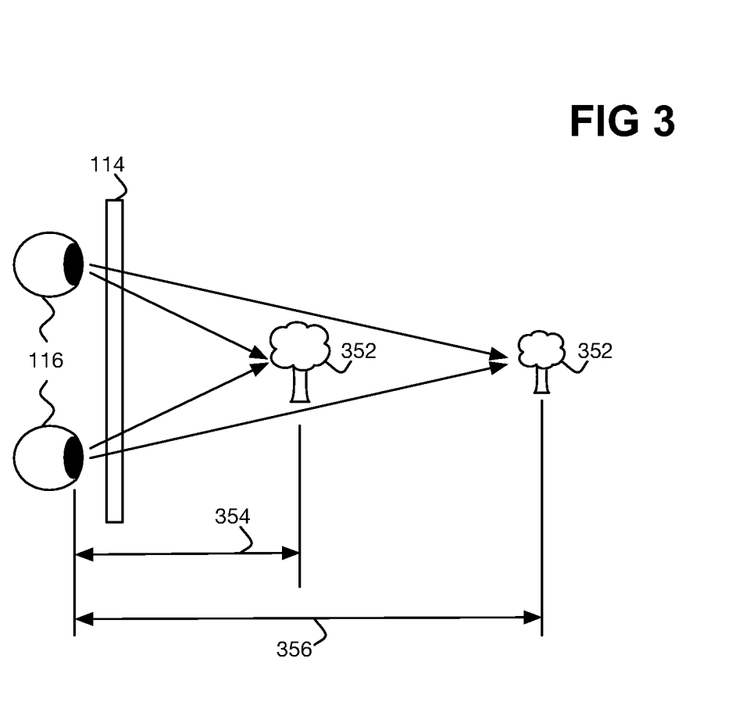
FIG. 3 is a diagram of example HMD virtual image distance adjustment.

FIG. 3 shows an example adjustment of the virtual image distance. The initial virtual image distance 354 is the distance between the eyes 116 of the HMD wearer 102 and the virtual image 352 being viewed by the wearer 102 as a result of immersion within the virtual environment via the HMD 100. The virtual image distance 354 is not the distance between the wearer 102's eyes 116 and the display panel 106 of FIG. 1C, but rather the distance between the eyes 116 and the virtual image 352 that is being projected or displayed by the panel 106, as viewed by the wearer 102 through the lens 114.

For example, the initial virtual image distance 354 may be a result of the lens 114 having a shorter focal length and the display panel 106 displaying the image 352 relatively larger, causing the HMD wearer 102 to focus on the image 352 as if it were (i.e., as it virtually is) located relatively close to the wearer 102. Maintaining such relatively close focus over time can result in the eyes 116 of the wearer 102 to tire, resulting in eye strain, eye fatigue, and/or blurred vision. Therefore, the initial virtual image distance 354 may be increased, or lengthened to a subsequent virtual image distance 356.

The subsequent virtual image distance 356 may be a result of the lens 114 having a longer focal length and the display panel 106 displaying the image 352 relatively smaller, causing the HMD wearer 102 to focus on the image 352 as if it were (i.e., as it virtually is) located relatively far from the wearer 102. Via the eye muscles of the HMD wearer 102 changing focus of the wearer 102's eyes 116 in this manner, eye tiredness can be relieved. This is because less muscle tension is needed to focus on a farther away image 352 than one that is closer to the wearer 102.

The initial virtual image distance 354 may correspond to a focal length of the lens 114 that focuses the eyes 116 of the HMD wearer 102 on an image 352 projected or displayed by the display panel 106 in a way that maximally uses the entire size (i.e., surface) of the panel 106. As focal length increases, the wearer 102's eyes 116 are focused on an image 352 that is projected or displayed by the display panel 106 that is smaller, since the image 352 is virtually farther away at the subsequent virtual image distance 356. As a result, less of the entire size (i.e., surface) of the panel 106 is used to display or project the image 352.

Figure 4:
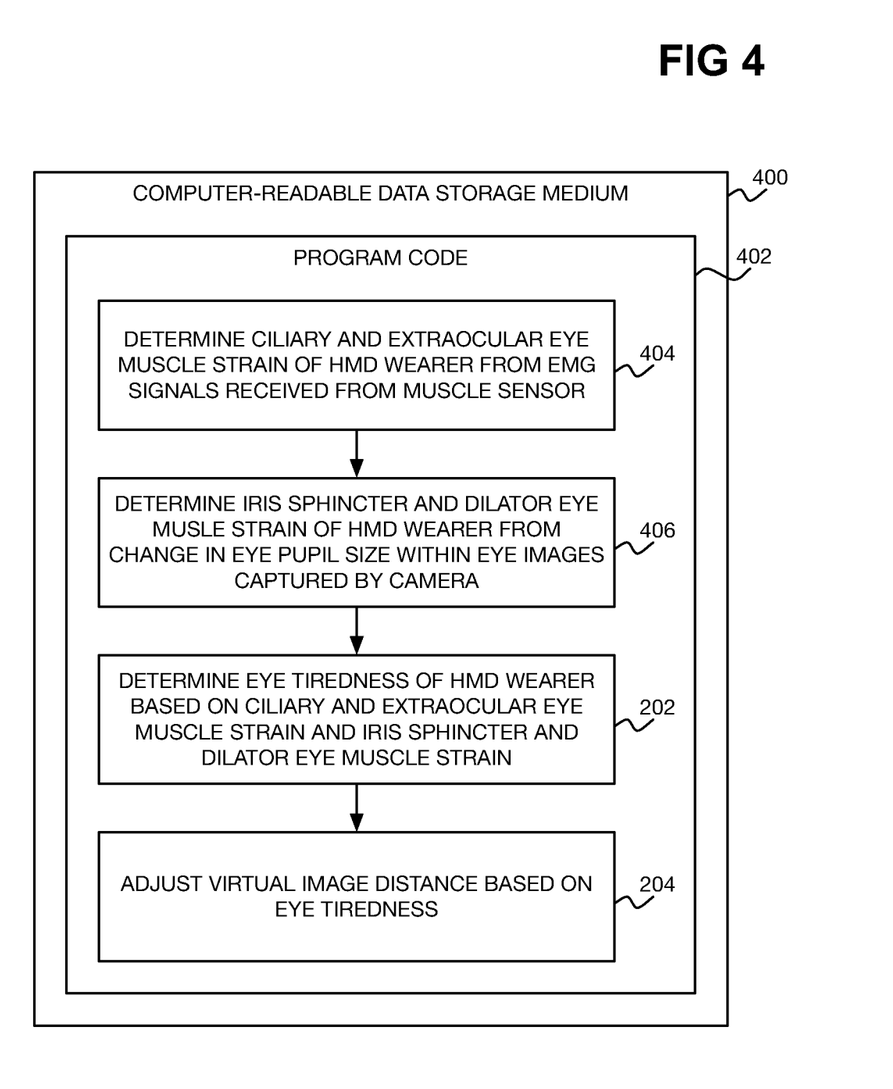
FIG. 4 is a diagram of an example non-transitory computer-readable data storage medium storing program code for adjusting HMD virtual image distance based on eye tiredness of the HMD wearer.

FIG. 4 shows an example non-transitory computer-readable data storage medium 400 storing program code 402 executable by a processor to perform processing to adjust virtual image distance based on eye tiredness of the HMD wearer 102. The processor may be that of the circuitry 112 of the HMD 100, or of a host computing device to which the HMD 100 is communicatively connected. The processing of FIG. 4 is consistent with but more detailed than the method 200.

The processing includes determining ciliary and extraocular eye muscle strain of the HMD wearer 102 from EMG signals received from the muscle sensor 108 (404). In general, the slope at the median frequency of the EMG signal decreases over time as the eyes 116 of the wearer 102 become tired. Specifically, a decrease in median frequency slope over time corresponds to increased ciliary and extraocular eye muscle strain of the HMD wearer 102.

Figure 5:
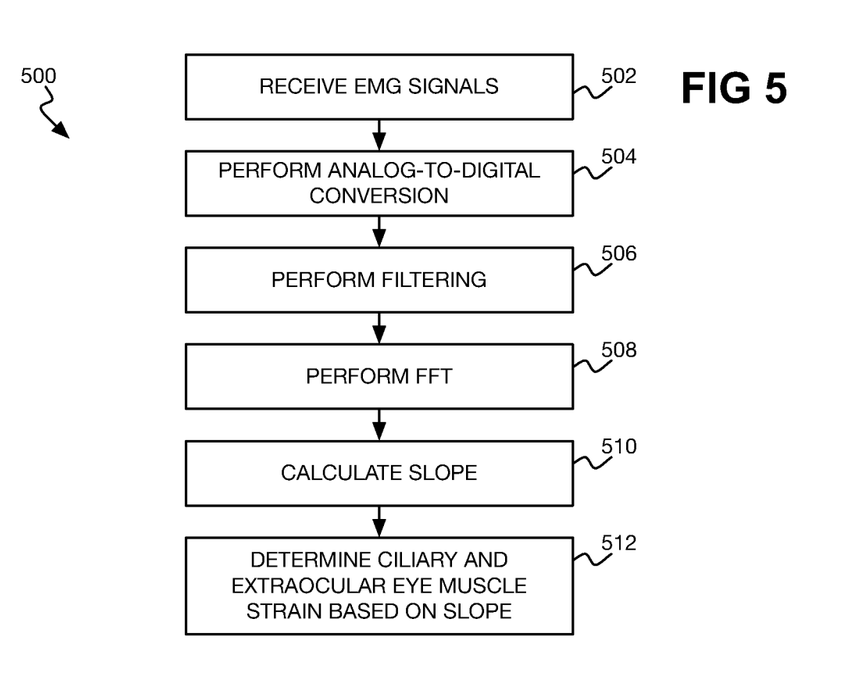
FIGS. 5 and 6 are flowchart of example methods for determining ciliary and extraocular eye muscle strain based on electromyographic (EMG) signals received from an HMD muscle sensor.

FIG. 5 shows an example method 500 for determining ciliary and extraocular eye muscle strain from EMG signals of the muscle sensor 108. The method 500 can implement part 404 of FIG. 4. The method 500 includes receiving EMG signals from the muscle sensor 108 (502). If the EMG signals are in analog form, the method 500 can include performing analog-to-digital conversion (ADC) to digitize the EMG signals (504). The method 500 can include then subjecting the digital EMG signals to a high pass filter to remove background noise from the signals (506).

The method 500 includes then performing a fast Fourier transform (FFT) on the digital EMG signals to transform the signals from the time domain to the frequency domain (508). The method 500 includes calculating the slope of the EMG signals in the frequency domain (i.e., from the FFT) (510). Specifically, the slope can be calculated by computing the change in median frequency of the EMG signals from a first time to a second time in the frequency domain, and then dividing the computed median frequency by the difference in time between the first and second times.

For example, at time t1, the median frequency of the EMG signals in the frequency domain may be f1. At time t2, the median frequency of the EMG signals in the frequency domain may be f2. Therefore, the slope of the EMG signals can be calculated as (f2−f1)/(t2−t1). The time duration between times t1 and t2 may be preset. The method 500 includes then determining the ciliary and extraocular eye muscle strain of the HMD wearer 102 based on the calculated slope of the EMG signals (512).

Figure 6:
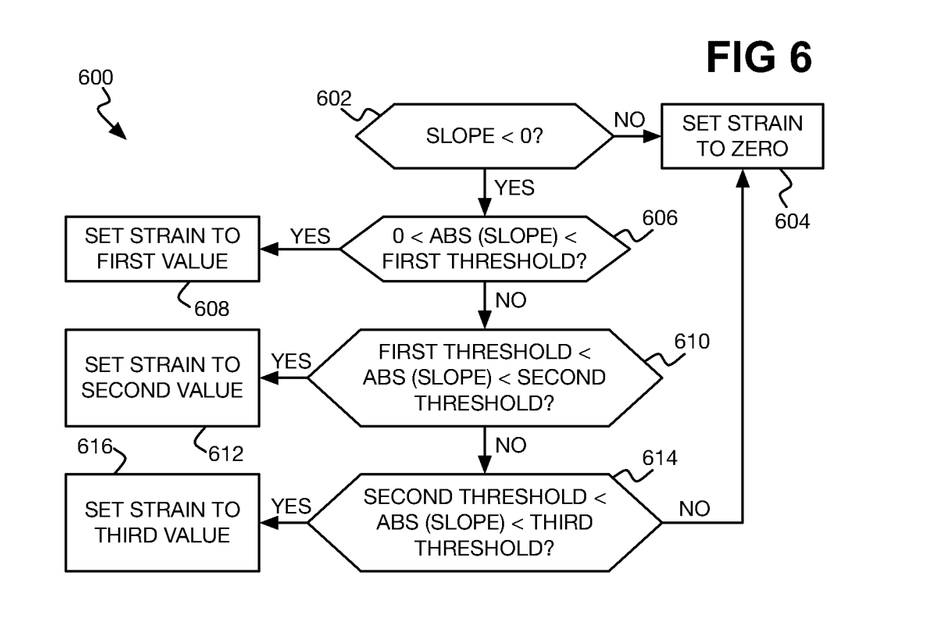

FIG. 6 shows an example method 600 for determining the ciliary and extraocular eye muscle strain of the HMD wearer 102 based on the calculated slope of the EMG signals. The method 600 can implement part 512 of FIG. 5. If the slope of the EMG signals is not less than zero (602), then the wearer 102 is not experiencing eye tiredness resulting from ciliary and extraocular eye muscle strain. As a result, the ciliary and extraocular eye muscle strain is set to zero (604).

If the slope is less than zero (604), then the wearer 102 may be experiencing eye tiredness resulting from ciliary and extraocular eye muscle strain. If the magnitude of the slope (i.e., the absolute value of the slope) is between zero and a first threshold (606), then ciliary and extraocular eye muscle strain is set to a first value (608). If the magnitude of the slope is greater than the first threshold but less than a second threshold (that is greater than the first threshold) (610), then ciliary and extraocular eye muscle strain is set to a second value greater than the first value (612). If the magnitude is greater than the second threshold but less a third threshold (that is greater than the second threshold) (614), then ciliary and extraocular eye muscle strain is set to a third value greater than the second value (616).

As such, in the method 600, as the slope of the EMG signals becomes more negative, ciliary and extraocular eye muscle strain is correspondingly set to larger values. However, if the magnitude of the slope is greater than the third threshold (614), ciliary and extraocular eye muscle strain is nevertheless set to zero (604). The third threshold may correspond to the largest slope that is physically possible. Therefore, if the slope is larger in magnitude than the third threshold, the EMG signals received from the muscle sensor 108 may be erroneous, such that ciliary and extraocular muscle strain cannot be reliably ascertained (and thus set to zero).

Referring back to FIG. 4, the processing includes determining iris sphincter and dilator eye muscle strain of the HMD wearer 102 from a change in eye pupil size of the wearer 102 within eye images captured by the camera 110 (406). In general, larger changes in eye pupil size (either resulting in a smaller eye pupil or a larger eye pupil) result as the eyes 116 of the wearer 102 become tired. Specifically, large changes in eye pupil size over time correspond to increased iris sphincter and dilator eye muscle strain of the HMD wearer 102.

Figure 7A:
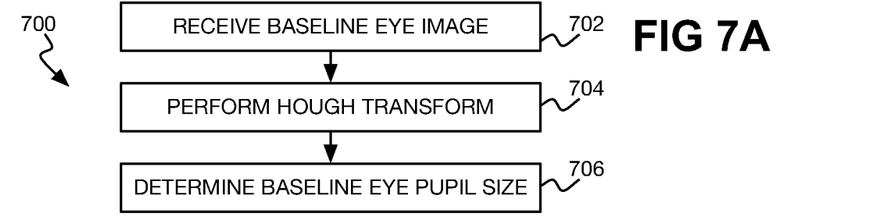
FIGS. 7A, 7B, and 8 are flowcharts of example methods for determining iris sphincter and dilator eye muscle strain from eye images received from an HMD camera.
Figure 7B:
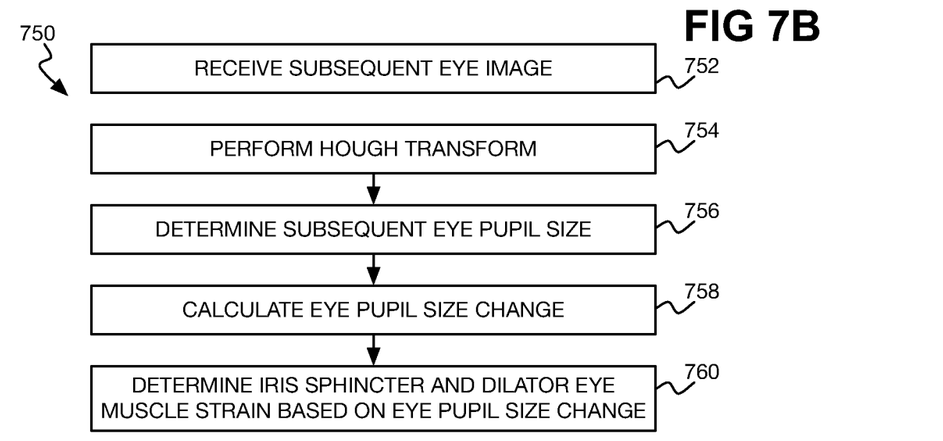

FIGS. 7A and 7B show example methods 700 and 750 for determining iris sphincter and dilator eye muscle strain from a change in eye pupil size within eye images captured by the camera 110. The methods 700 and 750 can implement part 406 of FIG. 4. The method 700 of FIG. 7A is performed when the wearer 102 has first started wearing the HMD 100 in a given XR session, and thus presumably is not experiencing eye tiredness. The method 700 includes receiving what is referred to as a baseline (or initial) eye image from the camera 110 (702).

The method 700 can include performing a Hough transform on the baseline eye image to permit easier identification of the eye pupil within the image (704). The method 700 includes determining or measuring what is referred to as a baseline (or initial) eye pupil size upon locating the eye pupil within the baseline eye image (706). The baseline eye pupil size may be the radius or diameter of the eye pupil, for instance. In one implementation, the method 700 may be performed a number of times when the wearer 102 has first started wearing the HMD 100 in a given XR session, and the median or average of the determined eye pupil sizes set as the baseline eye pupil size.

The method 750 of FIG. 7B is then performed after the method 700 of FIG. 7A has been performed. The method 750 similarly includes receiving what is referred to as a subsequent eye image from the camera 110 (752), since the subsequent eye image is captured at a point in time after the point in time when the baseline eye image was captured. The method 750 can include performing a Hough transform on the subsequent eye image (754), and then determining or measuring what is referred to as a subsequent eye pupil size upon locating the eye pupil within the subsequent eye image (756) The subsequent eye pupil size may also be the radius or diameter of the eye pupil.

In one implementation, parts 752, 756, and 758 may be repeatedly performed during a time period, such as repeatedly within a ten-minute period. The median or average of the determined eye pupil sizes may then be set as the subsequent eye pupil size. The method 750 includes then calculating the change in eye pupil size (758), from the baseline eye pupil size to the subsequent eye pupil size. That is, the change in eye pupil size is the difference between the subsequent eye pupil size and the baseline eye pupil size. The method 750 includes determining the iris sphincter and dilator eye muscle strain based on the calculated eye pupil size change (760), and the method 750 may then be repeated in the next time period (e.g., in the next ten-minute period).

Figure 8:
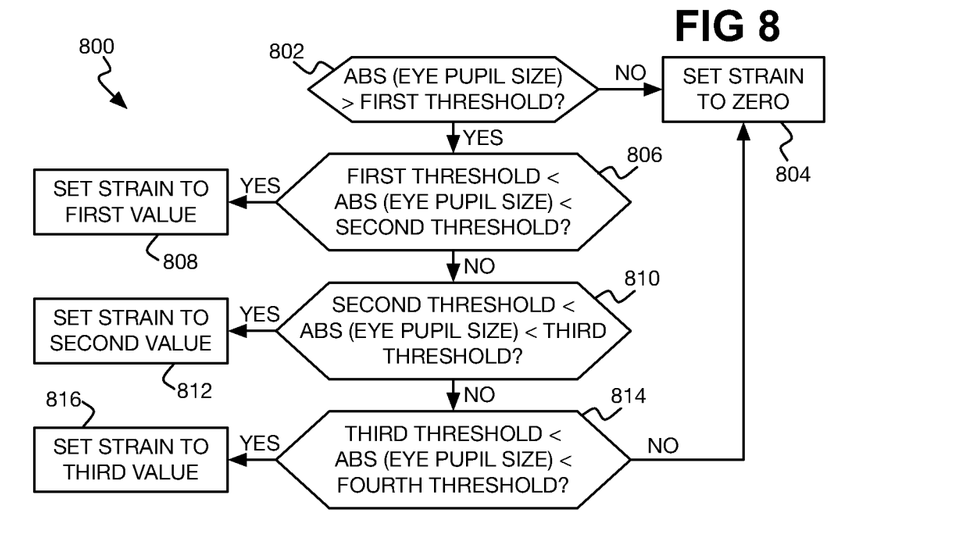

FIG. 8 shows an example method 800 for determining iris sphincter and dilator eye muscle strain of the HMD wearer 102 based on the calculated eye pupil size change. The method 800 can implemented part 760 of FIG. 7B. If the magnitude of the change in eye pupil size (i.e., the absolute value of the eye pupil size change) is not greater than a first threshold (802), then the wearer 102 may not be experiencing eye tiredness resulting from iris sphincter and dilator eye muscle strain. As a result, the iris sphincter and dilator eye muscle strain is set to zero (804). If the magnitude of the change in eye pupil size is greater than the first threshold (802), then the wearer 102 may be experiencing eye tiredness resulting from iris sphincter and dilator eye muscle strain.

Specifically, if the magnitude of the eye pupil size change is greater than the first threshold but less than a second threshold (that is greater than the first threshold) (806), then iris sphincter and dilator muscle strain is set to a first value (808). If the magnitude of the eye pupil size change is greater than the second threshold but less than a third threshold (that is greater than the second threshold) (810), then iris sphincter and dilator muscle strain is set to a second value greater than the first value (812). If the magnitude of the eye pupil size change is greater than the third threshold but less than a fourth threshold (that is greater than the third threshold) (814), then iris sphincter and dilator muscle strain is set to a third value greater than the second value (816). (The various values and thresholds in FIG. 8 can be different from those in FIG. 6.)

In the method 800, the greater the change in eye pupil size (with the pupil becoming either smaller or larger), the larger the value to which iris sphincter and dilator muscle strain is correspondingly set. However, if the magnitude of the change in eye pupil size is greater than the fourth threshold (814), then iris sphincter and dilator eye muscle strain is nevertheless set to zero (804). The fourth threshold may correspond to the largest change in eye pupil size that is physically possible. If the eye pupil size change is larger in magnitude than the fourth threshold, the subsequent eye pupil size may have been incorrectly determined from the subsequent eye image (e.g., the eye pupil may have been misidentified within this image). As such, iris sphincter and dilator eye muscle strain cannot be readily ascertained (and thus set to zero).

Referring back to FIG. 4, the processing includes determining the eye tiredness of the HMD wearer 102 based on the ciliary and extraocular eye muscle strain and the iris sphincter and dilator eye muscle strain that have been determined (202). The processing then includes adjusting the virtual image distance based on the determined tiredness (204). As noted, adjusting the virtual image distance can relieve the eye muscle strain of the wearer 102, and ameliorate the effects of eye tiredness being experiencing by the wearer 102.

Figure 9:
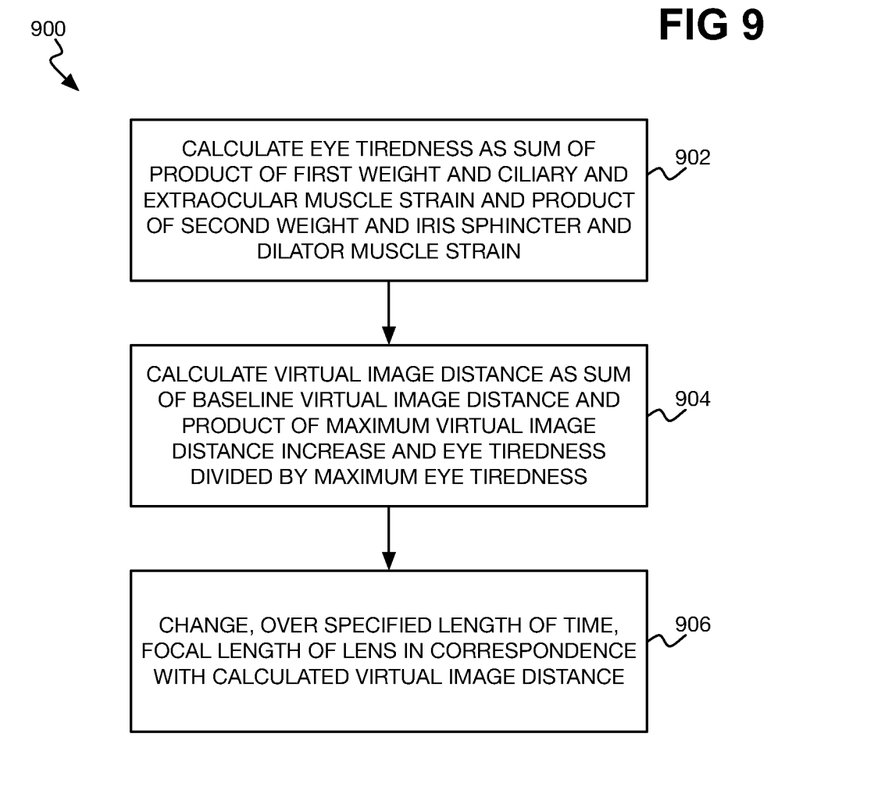
FIG. 9 is a flowchart of an example method for calculating eye tiredness from ciliary and extraocular eye muscle strain and from extraocular eye muscle strain and for adjusting HMD virtual image distance based on the calculated eye tiredness.

FIG. 9 shows an example method 900 for determining eye tiredness based on ciliary and extraocular eye muscle strain and iris sphincter and dilator eye muscle strain, and correspondingly adjusting virtual image distance. The method 900 can implement parts 202 and 204 of FIG. 4. The method 900 includes calculating eye tiredness of the HMD wearer 102 as the sum of the product of a first weight and the determined ciliary and extraocular eye muscle strain, and of the product of a second weight and the determined iris sphincter and dilator eye muscle strain (902).

For example, the eye tiredness may be calculated as (a*M1)+(b*M2), where M1 is the ciliary and extraocular eye muscle strain that has been determined, and M2 is the iris sphincter and dilator eye muscle strain that has been determined. The ciliary and extraocular eye muscle strain is weighted by a first weight a, whereas the iris sphincter and dilator eye muscle strain is weighted by a second weight b. The first and second weights can be adjusted relative to one another so that their relative contributions in the determined eye tiredness can be varied.

The method 900 includes calculating the virtual image distance as the sum of a baseline virtual image distance and the product of a maximum virtual image distance increase and the determined eye tiredness divided by a maximum eye tiredness (904). For example, the virtual image distance may be calculated as bd+(dmax*et/etmax). The baseline virtual image distance bd is the specified initial virtual image distance when the wearer 102 first starts wearing the HMD 100 in a given XR session, and presumably is not experiencing any eye tiredness. The maximum virtual image distance increase dmax is the largest length by which the virtual image distance can be increased in a given period of time (i.e., over a specified length of time).

The eye tiredness et is that which has been calculated in part 902. The maximum eye tiredness etmax is the greatest value of eye tiredness of the HMD wearer 102 that can be determined. For example, this can be the eye tiredness that is determined if the ciliary and extraocular eye muscle strain is set to a third value in FIG. 6 and the iris sphincter and dilator eye muscle strain is set to a third value in FIG. 8. The virtual image distance as calculated in part 904 can thus be no smaller than the baseline virtual image distance if the wearer 102 is experiencing no eye tiredness, and can be increased over a length of time to no more than the baseline virtual image distance plus the maximum virtual distance increase if the wearer 102 is experiencing maximum eye tiredness.

The method 900 includes then changing, over the specified length of time, the focal length of the lens 114 in correspondence with the virtual image distance that has been calculated (906). The current virtual image distance is thus changed gradually, over the specified length of time, until it is equal to the calculated virtual image distance so that the change is less noticeable, if at all, to the HMD wearer 102. For instance, the specified length of time may be ten minutes.

If the calculated virtual image distance is greater than the current virtual image distance, then the focal length of the lens 114 is increased over the specified length of time to realize the calculated virtual image distance at the conclusion of the specified length of time. This means that the wearer 102 is experiencing more eye tiredness than before. Therefore, the virtual image distance is correspondingly increased to alleviate such tiredness.

By comparison, if the calculated virtual image distance is less than the current virtual image distance, then the focal length of the lens 114 is decreased over the specified length of time to realize the calculated virtual image distance at the conclusion of the specified length of time. This means that the wearer 102 is experiencing less tiredness than before. Therefore, the virtual image distance can be correspondingly decreased.

Techniques have been described for alleviating eye strain and other deleterious effects that can result from eye tiredness experiencing by a wearer 102 of an HMD 100 during prolonged HMD usage. Specifically, virtual image distance is adjusted based on determined eye tiredness. As a result, the wearer 102 may be able to engage in longer XR sessions with less discomfort.

We claim:

1. A method comprising:
    determining, by a processor, an eye tiredness of a wearer of a head-mountable display (HMD) based on:
        ciliary and extraocular eye muscle strain of the wearer, or
        iris sphincter and dilator eye muscle strain of the wearer; and
    adjusting, by the processor, a distance from eyes of the wearer to a virtual image displayed by the HMD based on the eye tiredness.

2. The method of claim 1, wherein determining the ciliary and extraocular eye muscle strain of the wearer of the HMD comprises:
    receiving, from a muscle sensor of the HMD positioned against a face of the wearer, electromyographic (EMG) signals,
    wherein the ciliary and extraocular eye muscle strain of the wearer is determined based on the EMG signals.

3. The method of claim 1, wherein determining the iris sphincter and dilator eye muscle strain of the wearer of the HMD comprises:
    receiving, by the processor from an infrared (IR) camera of the HMD directed towards one of the eyes of the wearer, eye images; and
    determining, by the processor, a change in eye pupil size of the wearer from the eye images,
    wherein the iris sphincter and dilator eye muscle strain of the wearer is determined based on the change in eye pupil size.

4. The method of claim 1, wherein adjusting the distance from the eyes of the wearer to the virtual image comprises:
    changing, by the processor over a specified length of time, a focal length of a lens of the HMD positioned between the eyes of the wearer and a display panel of the HMD based on the eye tiredness.

5. A non-transitory computer-readable data storage medium storing program code executable by a processor to perform processing comprising:

determining ciliary and extraocular eye muscle strain of a wearer of a head-mountable display (HMD) from electromyographic (EMG) signals received from a muscle sensor of the HMD positioned against a face of the wearer;

determining iris sphincter and dilator eye muscle strain of the wearer of the HMD from a change in eye pupil size of the wearer within eye images captured by an infrared (IR) camera of the HMD directed towards an eye of the wearer;

determining an eye tiredness of the wearer of the HMD based on the ciliary and extraocular eye muscle strain and the iris sphincter and dilator eye muscle strain of the wearer; and adjusting a distance to a virtual image displayed by the HMD based on the eye tiredness.

6. The non-transitory computer-readable data storage medium of claim 5, wherein determining the ciliary and extraocular eye muscle strain of the wearer of the HMD comprises:

receiving the EMG signals from the muscle sensor of the HMD;

performing a fast Fourier transform (FFT) of the EMG signals;

calculating a slope of the EMG signals from the FFT; and determining the ciliary and extraocular eye muscle strain of the wearer based on the slope of the EMG signals.

7. The non-transitory computer-readable data storage medium of claim 6, wherein determining the ciliary and extraocular eye muscle strain of the wearer based on the slope of the EMG signals comprises, in response to the slope being less than zero:

setting the ciliary and extraocular eye muscle strain to a first value if an absolute value of the slope is less than a first threshold;

setting the ciliary and extraocular eye muscle strain to a second value greater than the first value if the absolute value is between the first threshold and a second threshold greater than the first threshold; and setting the ciliary and extraocular eye muscle strain to a third value greater than the second value if the absolute value is between the second threshold and a third threshold greater than the second threshold.

8. The non-transitory computer-readable data storage medium of claim 5, wherein determining the iris sphincter and dilator eye muscle strain of the wearer of the HMD comprises:

receiving a baseline eye image of the wearer from the IR camera of the HMD;

determining a baseline eye pupil size of the wearer from the baseline eye image;

receiving a subsequent eye image of the wearer from the IR camera of the HMD;

determining a subsequent eye pupil size of the wearer from the subsequent eye image;

calculating the change in eye pupil size as a difference between the subsequent eye pupil size and the baseline eye pupil size; and determining the iris sphincter and dilator eye muscle strain of the wearer based on the change in eye pupil size.

9. The non-transitory computer-readable data storage medium of claim 8, wherein determining the iris sphincter and dilator eye muscle strain of the wearer based on the change in eye pupil size comprises, in response to an absolute value of the change in eye pupil size being greater than a first threshold:

setting the iris sphincter and dilator eye muscle strain to a first value if the absolute value is between the first threshold and a second threshold greater than the first threshold;

setting the iris sphincter and dilator eye muscle strain to a second value greater than the first value if the absolute value is between the second threshold and a third threshold greater than the second threshold; and setting the iris sphincter and dilator eye muscle strain to a third value greater than the second value if the absolute value is between the third threshold and a fourth threshold greater than the second threshold.

10. The non-transitory computer-readable data storage medium of claim 5, wherein determining the eye tiredness of the wearer of the HMD based on the ciliary and extraocular muscle strain and the iris sphincter and dilator eye muscle strain of the wearer comprises:

calculating the eye tiredness of the wearer as a sum of a first product of a first weight and the ciliary and extraocular muscle strain and a second product of a second weight and the iris sphincter and dilator eye muscle strain.

11. The non-transitory computer-readable data storage medium of claim 5, wherein adjusting the distance to the virtual image displayed by the HMD based on the eye tiredness comprises:

calculating the distance to the virtual image as a sum of a baseline virtual image distance and a product of a maximum virtual image distance increase and the eye tiredness divided by a maximum eye tiredness.

12. The non-transitory computer-readable data storage medium of claim 5, wherein adjusting the distance to the virtual image displayed by the HMD based on the eye tiredness further comprises:

changing, over a specified length of time, a focal length of a lens of the HMD positioned between the wearer and a display panel of the HMD in correspondence with the distance to the virtual image as has been calculated.

13. A head-mountable display (HMD) comprising:

a lens having a focal length that is adjustable;

a display panel viewable by a wearer of the HMD through the lens;

a camera to capture eye images of the wearer;

a muscle sensor positionable against a face of the wearer to output electromyographic (EMG) signals; and circuitry to:

determine ciliary and extraocular eye muscle strain of the wearer from the EMG signals;

determine iris sphincter and dilator eye muscle strain of the wearer from a change in eye pupil size of the wearer within the eye images;

determine an eye tiredness of the wearer based on the ciliary and extraocular eye muscle strain and the iris sphincter and dilator eye muscle strain;

adjust a virtual image distance of the HMD by adjusting the focal length of the lens based on the eye tiredness.

14. The HMD of claim 13, wherein the muscle sensor is an electromyographic (EMG) sensor.

15. The HMD of claim 13, wherein the camera is an infrared (IR) camera.

16. The HMD of claim 13, wherein the lens is a liquid crystal lens and the circuitry is to adjust the focal length of the lens by adjusting a voltage applied between electrodes on either side of the liquid crystal lens.

17. The HMD of claim 13, wherein the circuitry to adjust the virtual image distance of the HMD by adjusting the focal length of the lens based on the eye tiredness includes the circuitry to adjust the virtual image distance of the HMD to increase the virtual image distance.

18. The HMD of claim 13, wherein the circuitry to adjust the virtual image distance of the HMD by adjusting the focal length of the lens based on the eye tiredness includes the circuitry to gradually adjust the virtual image distance of the HMD over a length of time from a baseline virtual image distance to a new virtual image distance.

19. The HMD of claim 18, wherein the new virtual image distance is calculated based on a calculated amount of the eye tiredness.

20. The HMD of claim 13, wherein the circuitry is to:
receive a baseline eye image from the camera; and
determine the iris sphincter and dilator eye muscle strain of the wearer from the change in eye pupil size of the wearer within the eye images as compared to the baseline eye image.

* * * * *